(12) United States Patent
Goossen

(10) Patent No.: US 6,307,691 B1
(45) Date of Patent: Oct. 23, 2001

(54) OPTICAL FILTER AND METHOD FOR LINEARIZATION OF OPTICAL POWER EQUALIZER

(75) Inventor: Keith Wayne Goossen, Aberdeen, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/369,919

(22) Filed: Aug. 6, 1999

(51) Int. Cl.[7] .............................. G02B 5/22; G02B 27/00; G02B 1/10; G02B 6/26; H04J 14/02
(52) U.S. Cl. ..................... 359/885; 359/577; 359/578; 359/124; 359/586; 359/247; 385/31
(58) Field of Search .................................. 359/578, 579, 359/885, 586, 247, 260, 291, 124, 123; 385/52, 31

(56) References Cited

U.S. PATENT DOCUMENTS 5,914,804 * 6/1999 Goossen .............................. 359/247
5,940,558 * 8/1999 Bishop et al. ........................ 385/52
5,943,155 * 8/1999 Goossen ............................... 259/247

* cited by examiner

Primary Examiner—Audrey Chang

(57) ABSTRACT

An optical filter for correcting non-linear gains across a wavelength band includes a first layer having a first layer thickness according to the formula: first layer thickness= $m\lambda/(4n_{first})$, where m is an odd multiple integer, $\lambda$ is the central wavelength of the wavelength band, and $n_{first}$ is the refractive index of the first layer, and a second layer having a second layer thickness according to the formula: second layer thickness=$\lambda/(4n_{second})$, where $\lambda$ is the central wavelength of the wavelength band, and $n_{second}$ is the refractive index of the second layer. The optical filter introduces an insertion loss for wavelengths in a wavelength band of optical fiber transmission having an insertion loss curve approximating a quadratic shape in the wavelength band and having a maximum insertion loss at a central wavelength of the wavelength band.

3 Claims, 6 Drawing Sheets

OPTICAL FILTER AND METHOD FOR LINEARIZATION OF OPTICAL POWER EQUALIZER

BACKGROUND OF THE INVENTION

1. Field of the Invention

The present invention relates to an optical filter for correcting non-linear gain or attenuation in a wavelength band of the optical system by adding an insertion loss having a quadratic-shaped insertion loss curve in the wavelength band and having a maximum insertion loss at a center wavelength of the wavelength band.

2. Description of the Related Art

Optical fiber communications systems are advantageously and desirably used to transport data in the form of light pulses over long distances because they exhibit a very large capacity for carrying information, are light-weight, and are immune to electromagnetic interference. In some systems, several optical carriers of different wavelengths are used to simultaneously propagate the multiple wavelengths along the same fiber. These are referred to as Wavelength Division Multiplexed (WDM) systems and further increase the capacity of optical systems.

In a typical WDM system, optical fiber amplifiers are used to increase the power level of the optical signals and are typically arranged along a fiber path to keep the optical signal levels above the system noise. However, these optical amplifiers such, for example, as Erbium-doped fiber amplifiers (EDFA) typically exhibit wavelength dependent gains. The tendency is to have the gain at a maximum near the center of the wavelength band.

Furthermore, the attenuation rate of the transmitted signal in the optical fiber varies depending on the carrier wavelength, thereby causing some channels, i.e. wavelengths, to have a higher power level than others at the receiving end of the optical fiber. The difference in attenuation rates of different wavelengths within the fiber is known as tilt. To correct the effects of tilt—i.e. to flatten the gain over the wavelength band of the WDM system—power equalizers are introduced into the optical systems. One such power equalizer is described in commonly-owned U.S. patent application Ser. No. 09/217,710, filed Dec. 21, 1998, which discloses an active filter that compensates for gain tilt in WDM systems. However, it has been found that for overall wavelength ranges of 100 nm, this device still deviated by as much as 0.65 dB from linearity. This is because, similar to the optical amplifier, the effect of the power equalizer is not linear. Therefore, although the tilt effect is lessened, the equalized wavelength band is non-linear.

Accordingly, a problem in existing WDM optical systems, specifically those which include optical amplifiers and power equalizers, is that a non-linear effect exists across the wavelength band of the WDM system.

SUMMARY OF THE INVENTION

An optical filter according to the invention corrects the non-linearity in gain across a wavelength band by inserting an insertion loss at different levels for the wavelengths of the wavelength band so that the insertion loss curve across the wavelength band approximates a quadratic shape. According to an embodiment of the invention, the filter includes a first layer of silicon dioxide and a second layer of silicon nitride on a substrate. The first layer has a thickness that equals $m\lambda/(4n_{SiO2})$ and the second layer has a thickness equal to $\lambda/(4n_{SiNx})$, where $\lambda$ is the center wavelength of the wavelength band, $n_{SiO2}$ is the refractive index of the first layer, $n_{SiNx}$ is the refractive index of the second layer, and m is an odd integer. The amount of insertion loss through the filter at the center wavelength of the wavelength band is determined by the refractive index of the silicon nitride layer. The slope of the insertion loss curve at the edges of the wavelength band is determined by the thickness of the silicon dioxide layer, i.e. different values of the odd integer or multiple m. Accordingly, an insertion loss curve may be designed using the inventive optical filter for correcting a deviation from linearity centered around a central wavelength by controlling the refractive index of the silicon nitride layer to a value corresponding to the amount of insertion loss required at the center wavelength, and setting the thickness of the silicon dioxide layer such that the slope or shape of the insertion loss curve at the edges of the wavelength band adequately corrects the deviation from linearity.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings, wherein like reference characters denote similar elements throughout the several views.

DETAILED DESCRIPTION OF THE CURRY PREFERRED EMBODIMENTS

Figure 1:
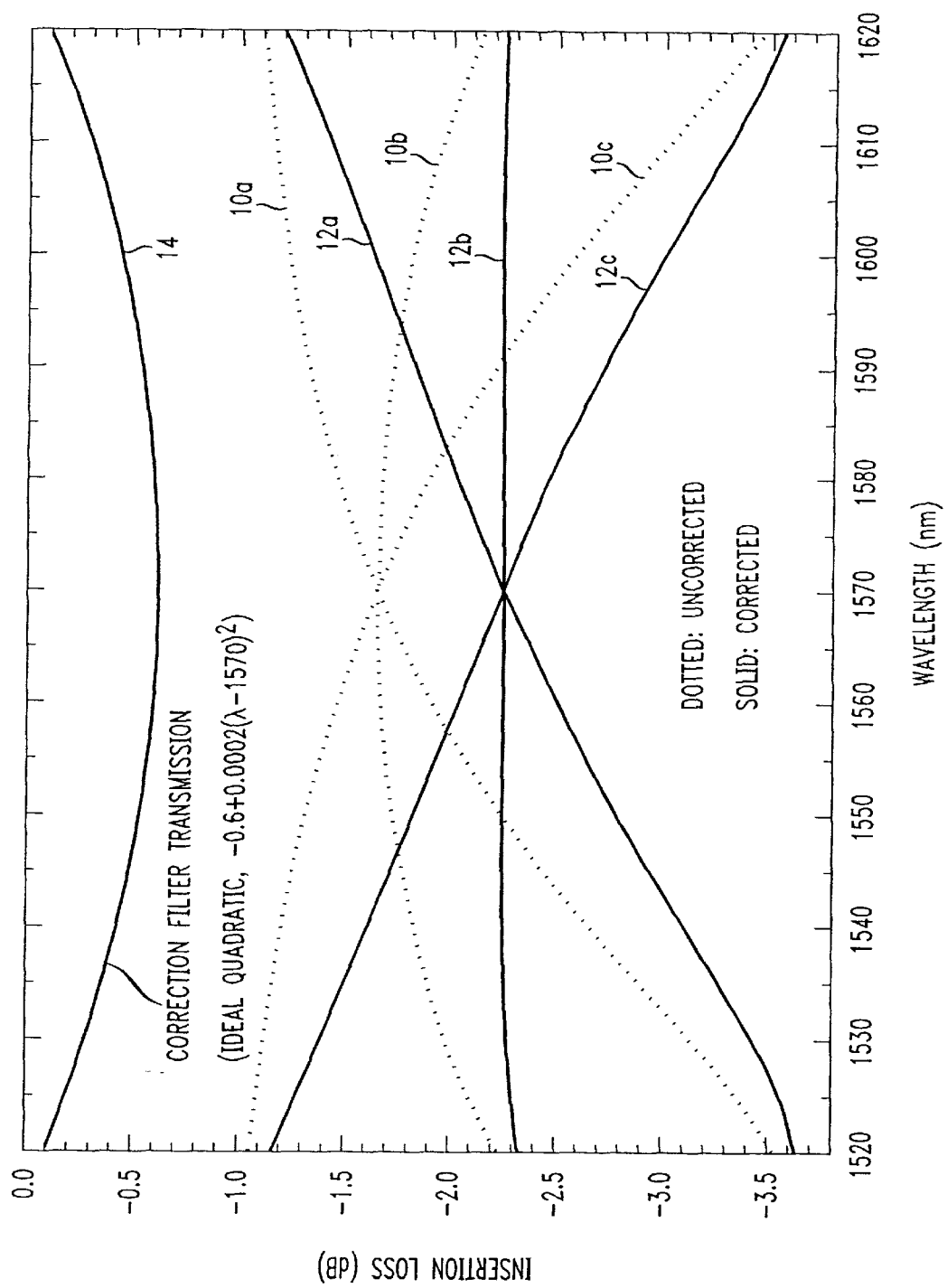
FIG. 1 is a graph showing the non-linear output of an optical power equalizer and an ideal co transmission for correcting the non-linearity.

Referring to FIG. 1, an ideal correction filter transmission 14 according to the invention is shown for correcting three outputs 10a, 10b, 10c of an Optical Power Equalizer which is disclosed in commonly-owned and co-pending U.S. patent application Ser. No. 09/217,710, filed Dec. 21, 1998, the entire contents of which are expressly incorporated herein by reference. The three separate outputs 10a, 10b, 10c in FIG. 1 represent three different biases of the Optical Power Equalizer. As is readily apparent from FIG. 1, the outputs 10a, 10b, 10c deviate from linearity. It has been discovered that a correction for this deviation from linearity can be approximated by a quadratic shaped curve which results from the quadratic equation:

$$\text{insertion loss} = a + b(\lambda_{actual} - \lambda_{center\ wavelength})^2$$

where a=the loss at the center wavelength of a wavelength band to correct linearity;

$\lambda_{center\ wavelength}$=the center wavelength of the wavelength band;

$\lambda_{actual}$=the actual wavelength being transmitted; and b=a constant which sets the degree of the curve of the quadratic-shaped curve (i.e., a higher constant b produces a steeper slope at the edges of the wavelength band).

Since the filter is introducing an insertion loss into the system, the loss should be minimized. Therefore, the largest amount of loss, which is at the center wavelength, must be sufficiently large to correct the deviation from linearity and the amount of loss at the outer edges of the band should be as small as possible. Since, the compensating curvature produced by the filter is limited to a value less than its insertion loss, there is a trade-off between resulting linearity and loss.

In FIG. 1, the ideal quadratic equation for correcting the outputs 10a, 10b, 10c is insertion loss=$-0.6+0.0002(\lambda_{actual}-1570)^2$. This equation produces the correction filter transmission 14 shown in FIG. 1. When the correction filter transmission 14 is applied to the outputs 10a, 10b, 10c of the Optical Power Equalizer, a corrected output 12a, 12b, 12c results which is approximately a linear function.

Figure 2:
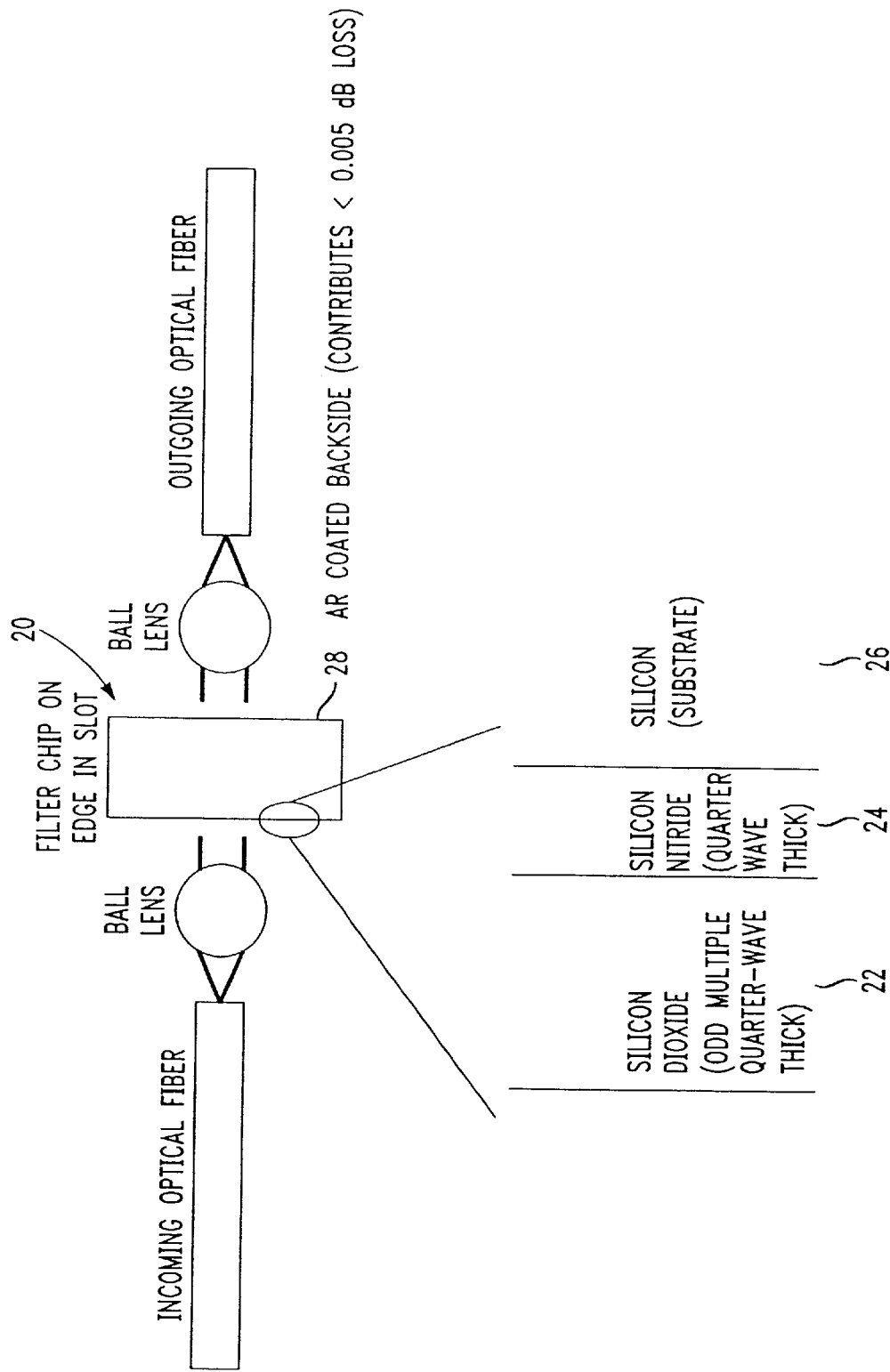
FIG. 2 shows a filter according to the present invention which exhibits the characteristics of the ideal correction filter transmission.
Figure 4:
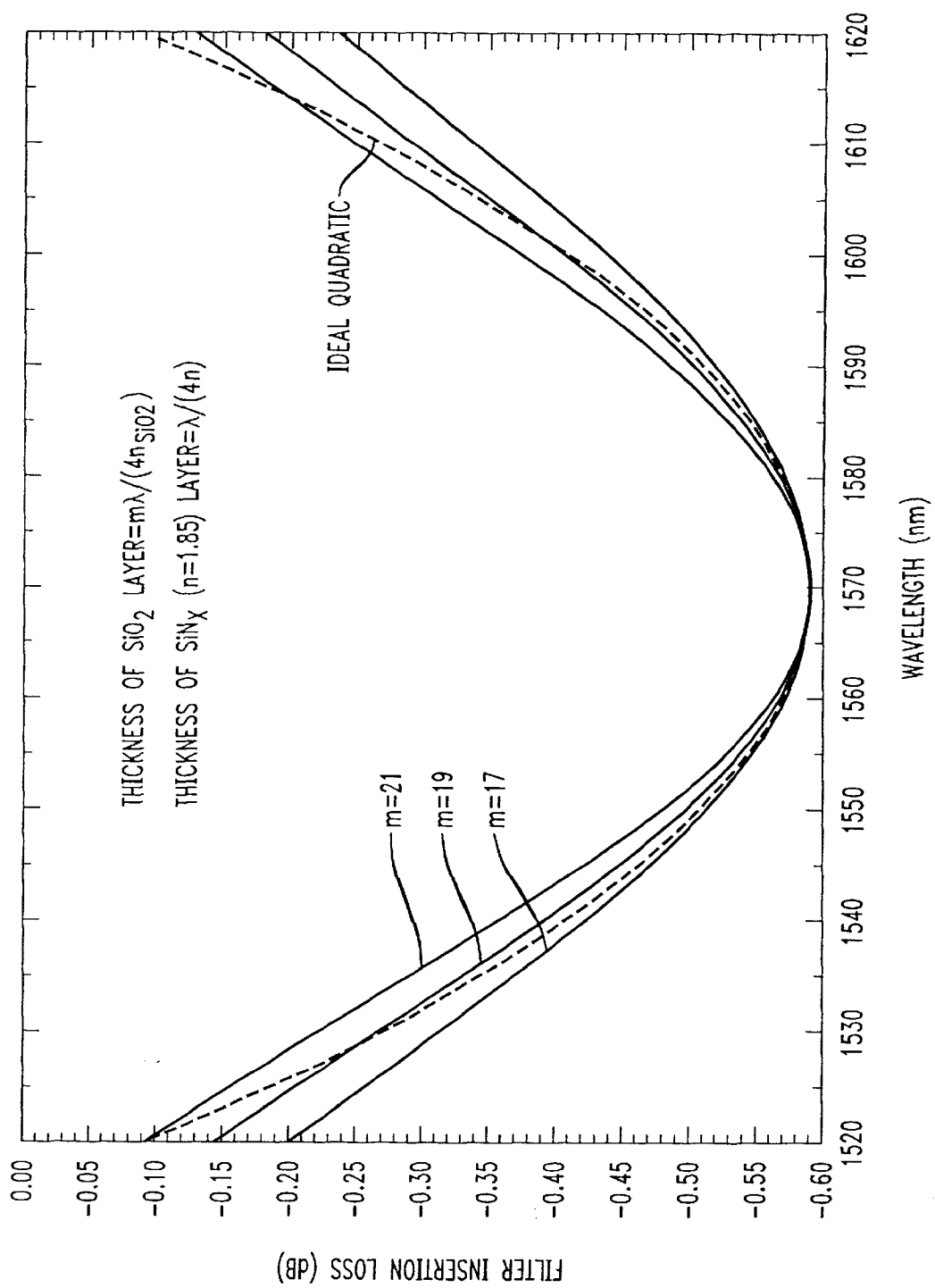
FIG. 4 is a graph showing the effects of the thickness of the Silicon dioxide layer of a filter on the correction filter transmission.

Referring to FIGS. 2 and 4, it has been found that a filter 20 formed of a first layer 22 comprising silicon dioxide ($SiO_2$ and a thickness equal to $m\lambda/(4n_{SiO2})$) and arranged on a second layer 24 comprising silicon nitride ($SiN_x$) and having a thickness equal to $\lambda/(4n_{SiNx})$ exhibits an output curve that approximates the quadratic-shaped correction transmission filter 14, where $\lambda$ is the center wavelength of the wavelength band, $n_{SiO2}$ is the refractive index of the first layer 22, $n_{SiNx}$ is the refractive index of the second layer 24, and m is an odd integer multiple. The first and second layers 22, 24 are arranged on a silicon substrate 26. The filter 20 may also include an anti-reflective coated backside 28 which contributes less than 0.005 dB loss.

Figure 3:
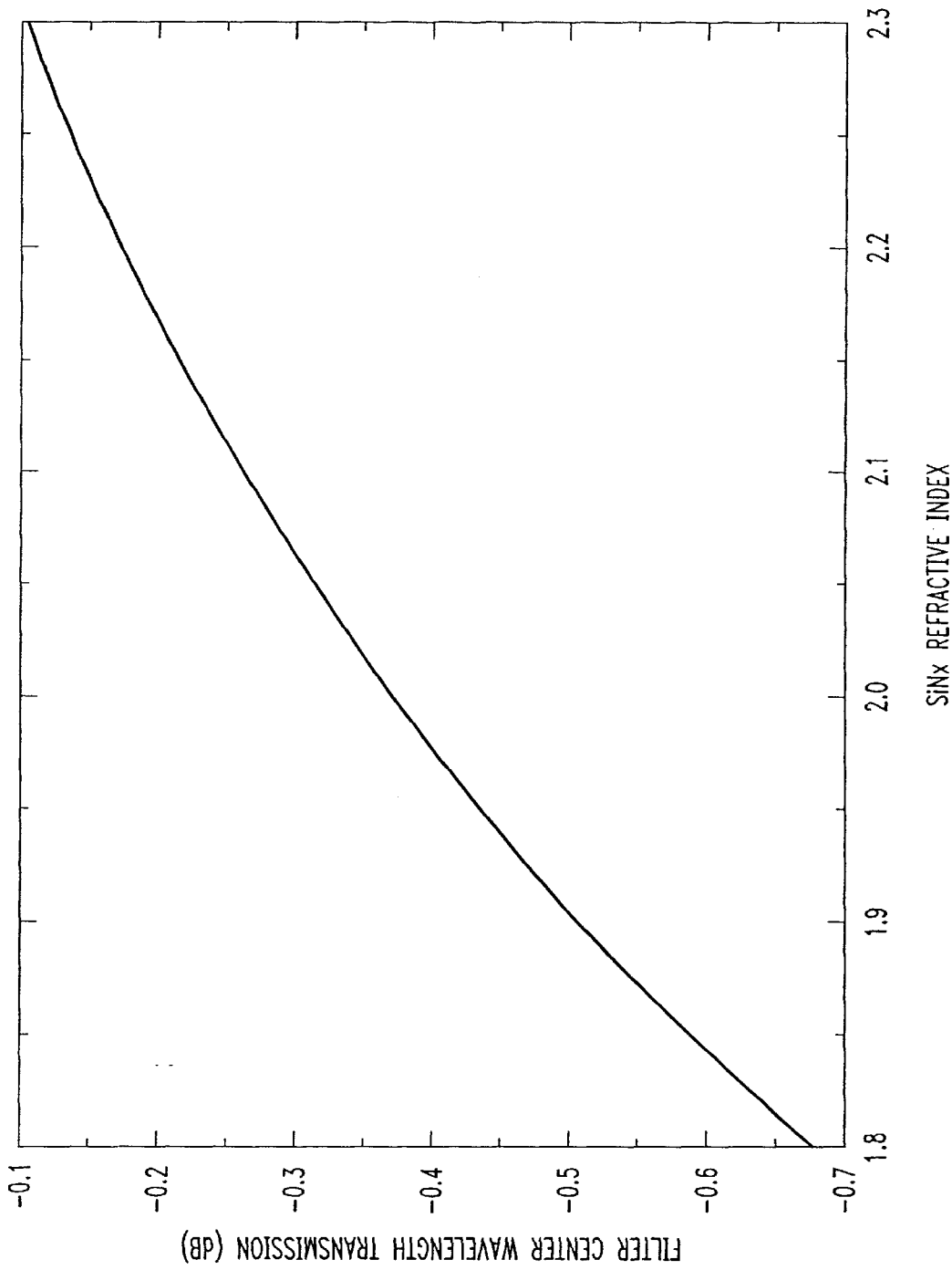
FIG. 3 is a graph depicting the filter center wavelength transmission as a function of the refractive index of the silicon nitride layer of the filter.

A change in the refractive index of the $SiN_x$ layer 24 ($n_{SiN}$) of filter 20 varies the amount of the filter center wavelength transmission (i.e. varies the amount of insertion loss at the central wavelength). That is, varying the refractive index of the second layer 24 is analogous to varying the value "a" in the above-listed quadratic equation. This relationship between the filter center wavelength transmission and the silicon nitride refractive index is shown in FIG. 3. The refractive index of pure silicon nitride may be altered by incorporating silicon in varying amounts into the silicon nitride to raise the refractive index, or incorporating oxygen in varying amounts into the silicon nitride for lowering the refractive index.

Referring again to FIG. 4, the shape of the output of the filter 20 may be adjusted by varying the thickness of the $SiO_2$ layer 22. FIG. 4 shows the resulting filter transmission curve 14a, 14b, 14c for a filter 20 having three different thicknesses of the $SiO_2$ layer 22. More specifically, FIG. 4 shows the curves for a filter 20 having thicknesses of odd integer multiples of m=17, 19, and 21, and demonstrates that varying the thickness of the $SiO_2$ layer 22 affects the shape of the curve and does not affect the filter transmission at the center wavelength. Therefore, altering the thickness of the $SiO_2$ layer 22 is analogous to changing the value of the constant "b" in the above quadratic equation.

Figure 5:
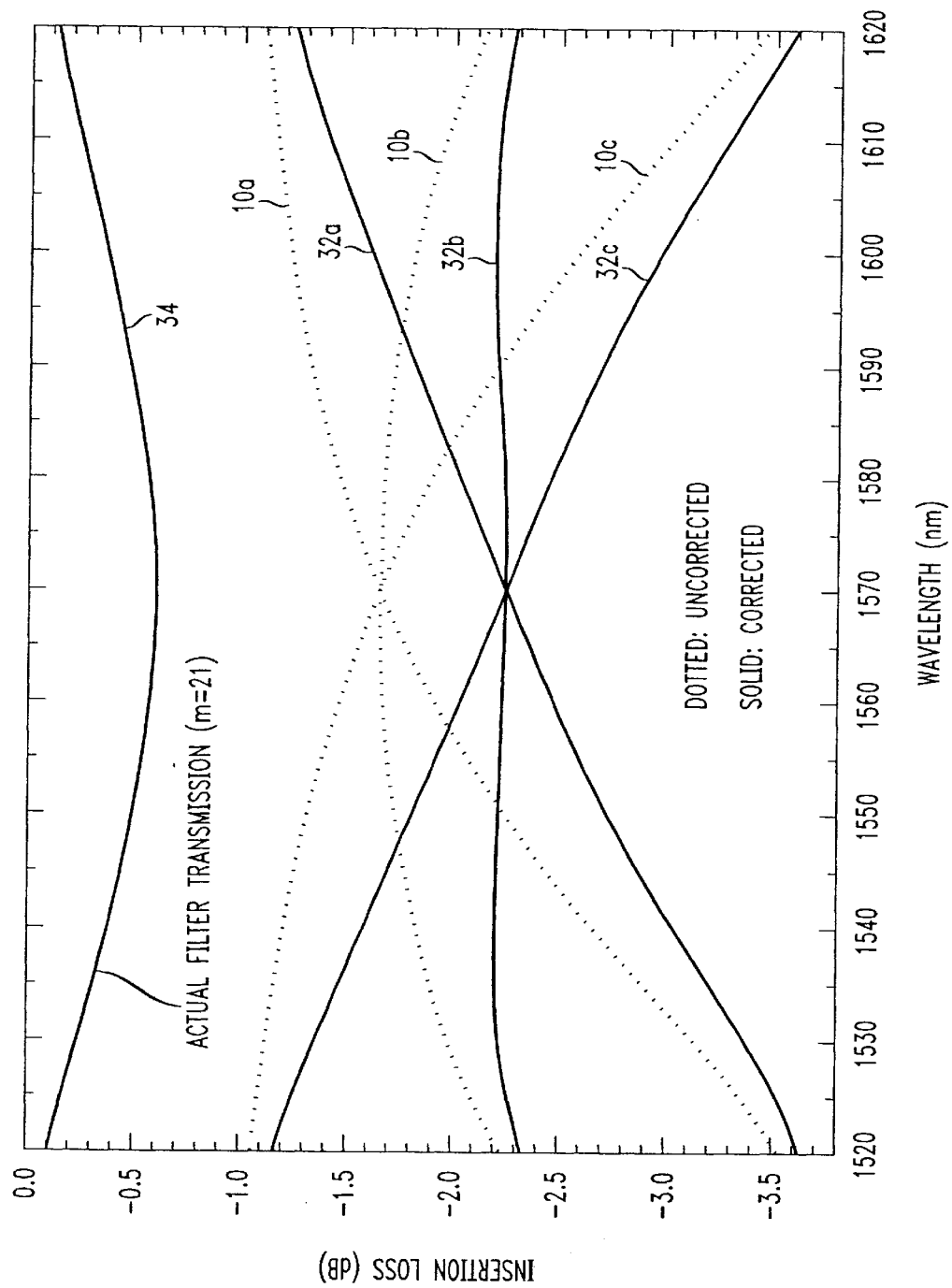
FIG. 5 a graph showing an actual filter transmission for a filter according to an embodiment of the present invention.

The filter 20 is adaptable to many applications by properly designing the silicon nitride refractive index $n_{SiN}$ to meet the appropriate transmission at the center wavelength of the wavelength band and properly designing the thickness of the $SiO_2$ layer 22 so that the filter corrects the non-linearity of the Optical Power Equalizer. FIG. 5 shows the actual filter transmission 34 (insertion loss) and the results of the corrected output 32a, 32b, and 32c when a filter having m=21 and the refractive index $n_{SiN}$ equal to 1.85 is applied to the Optical Power Equalizer outputs 10a, 10b, 10c.

Figure 6:
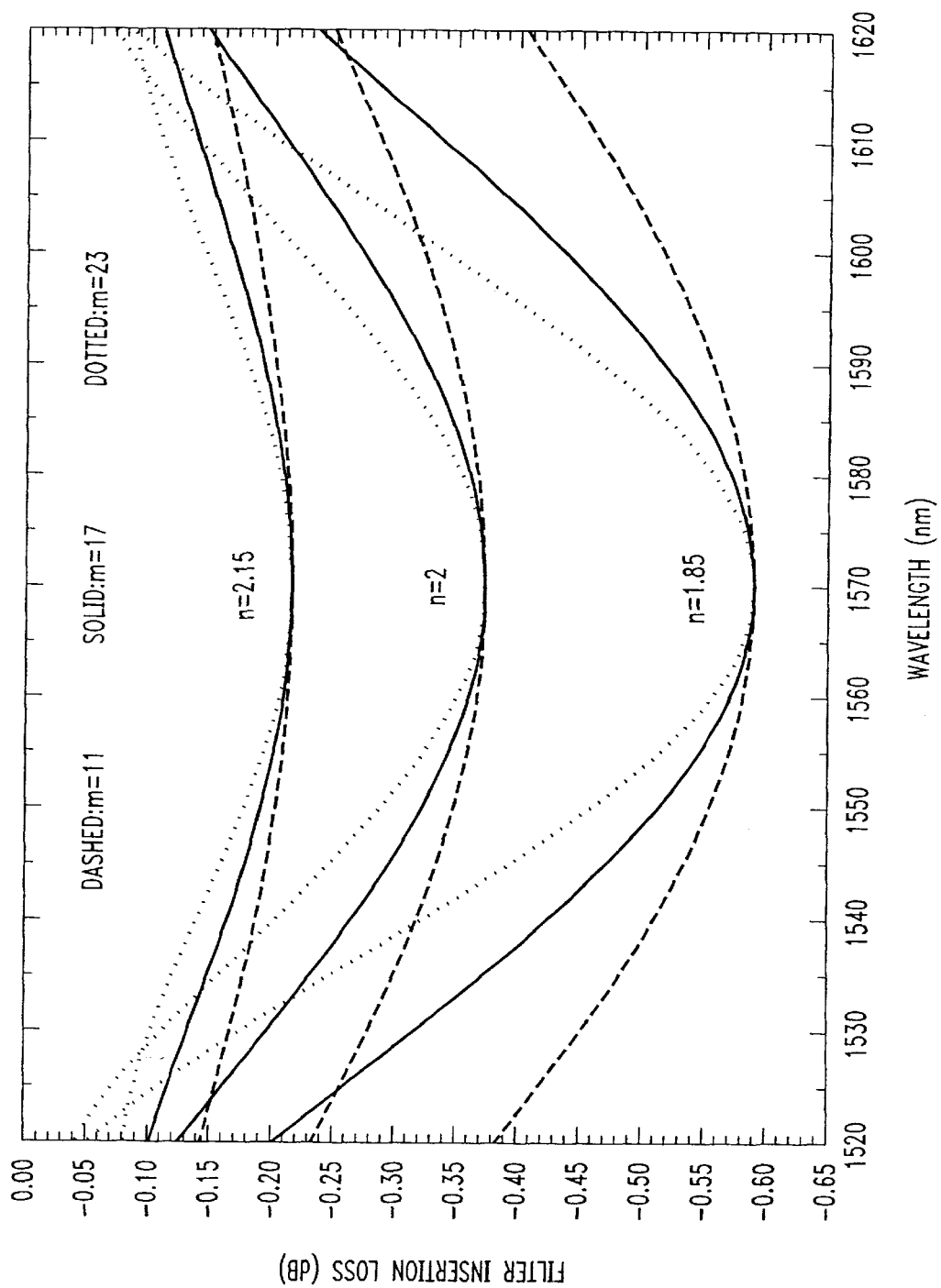
FIG. 6 is a graph showing filter transmissions for various embodiments of the filter according to the present invention.

Experiments have shown that the filter 20 corrects the deviation from linearity to as low as 0.2 dB. FIG. 6 shows examples of how the silicon nitride refractive index $n_{SiN}$ and the thickness of the $SiO_2$ layer 22 can be changed to alter the level of insertion loss and the shape of the insertion loss curve, respectively.

Although the preferred embodiment uses $SiO_2$ and $SiN_x$ as the material of the first and second layers 22, 24 of optical filter 20, other materials which exhibit similar characteristics can also be employed. The first layer 22 may, for example, comprise cryolite, magnesium flouride, or any other material that affects the slope of the insertion loss curve of the optical filter at the edges of the wavelength band (i.e. affects the degree of curvature of the insertion loss curve), and the second layer 24 may, for example, comprise silicon monoxide, zinc sulfide, or any other material in which a change in refractive index changes the amount of insertion loss at the center wavelength of the wavelength band. As is clearly shown in FIG. 6, altering the refractive index of the second layer not only determines the center wavelength value of the insertion loss, but also raises and lowers the entire insertion loss curve.

The specific embodiments of the invention shown in the drawings and described herein are directed to use of the optical filter 20 in series with an optical power equalizer. Nevertheless, the optical filter may be inserted in any optical system, with or without an optical power equalizer, to correct a quadratic-shaped non-linearity, such as may occur from an Er-doped optical amplifier (EDFA).

Thus, while there have shown and described and pointed out fundamental novel features of the invention as applied to preferred embodiments thereof, it will be understood that various omissions and substitutions and changes in the form and details of the methods disclosed and devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

I claim:

1. In a combination comprising an optical power equalizer and an optical filter, an output of said optical power equalizer across a wavelength band exhibiting a deviation from linearity correctable by an ideal quadratic-shaped insertion loss curve centered about a central wavelength of the wavelength band, the optical filter being arranged in series with the optical power equalizer for correcting the deviation from linearity, said optical filter comprising:

a first layer formed of a first material and having a first layer thickness according to the formula $$\text{first layer thickness} = m\lambda/(4n_{first}),$$

where m is an odd multiple integer, $\lambda$ is a center wavelength of the wavelength band, and $n_{first}$ is the refractive index of the first layer; and a second layer formed of a second material and having a second layer thickness according to the formula $$\text{second layer thickness} = \lambda/(4n_{second}),$$

where $\lambda$ is the center wavelength of the wavelength band, and $n_{second}$ is the refractive index of the second layer, wherein said optical filter exhibits an insertion loss curve approximating the ideal quadratic-shaped insertion loss curve in the wavelength band and has a maximum insertion loss at the center wavelength of the wavelength band, and wherein said refractive index of said second layer is variable and the insertion loss at said center wavelength is dependent on said refractive index of said second layer.

2. The combination of claim 1, wherein the shape of the insertion loss curve is determined by said value m of said first layer thickness.

3. A method for linearization of an optical transmission system using an optical filter inserted in the optical transmission system and having a first layer and a second layer and exhibiting an insertion loss curve across a wavelength band that approximates a quadratic-shaped curve, said method comprising the steps of:

a) determining an ideal quadratic-shaped insertion loss curve that corrects a non-linearity of the optical transmission system and has a maximum insertion loss at a central wavelength;

b) setting a thickness of the second layer of the optical filter equal to one quarter of the length of the central wavelength through the second layer;

c) varying the refractive index of the second layer such that the insertion loss of the optical filter at the central wavelength matches the maximum insertion loss of the ideal quadratic-shaped insertion loss curve determined in said step a; and d) setting a thickness of the first layer of the optical filter equal to an odd multiple integer m times one quarter of the length of the central wavelength through the first layer, and varying the thickness of the first layer by varying the odd multiple integer m for optimizing the approximation of the ideal quadratic-shaped curve by the optical filter at the ends of the wavelength band.

* * * * *